(12) United States Patent
Arai et al.

(10) Patent No.: US 7,237,602 B2
(45) Date of Patent: Jul. 3, 2007

(54) HEAT EXCHANGER

(75) Inventors: Takashi Arai, Saitama (JP); Jun Machida, Saitama (JP); Nobuyoshi Yoshida, Saitama (JP); Noriyuki Mizojiri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 73 days.

(21) Appl. No.: 11/116,674

(22) Filed: Apr. 27, 2005

(65) Prior Publication Data

US 2005/0236145 A1   Oct. 27, 2005

(30) Foreign Application Priority Data

Apr. 27, 2004  (JP)  .............................. 2004-131407

(51) Int. Cl.
*F28D 7/10*   (2006.01)
(52) U.S. Cl. .................................... 165/140; 165/133
(58) Field of Classification Search ................ 165/133, 165/140, 141
See application file for complete search history.

(56) References Cited

U.S. PATENT DOCUMENTS

| 1,738,914 A | * | 12/1929 | Mott ........................... 165/142 |
| 2,263,363 A | * | 11/1941 | Menshih ...................... 165/140 |
| 2,332,336 A | * | 10/1943 | Norris ......................... 165/141 |
| 2,475,025 A | * | 7/1949 | Huff ............................ 165/140 |
| 2,658,728 A | * | 11/1953 | Evans ........................ 165/11.1 |
| 4,090,554 A | * | 5/1978 | Dickinson .................. 165/11.1 |
| 2003/0129108 A1 | * | 7/2003 | Burch et al. ................. 165/138 |

FOREIGN PATENT DOCUMENTS

| JP | 6-55070 U | 7/1994 |
| JP | 07-004778 | 1/1995 |
| JP | 10-213382 | 8/1998 |
| JP | 10-227480 | 8/1998 |
| JP | 11-304389 | 11/1999 |

* cited by examiner

*Primary Examiner*—Teresa J. Walberg
(74) *Attorney, Agent, or Firm*—Lahive & Cockfield, LLP; Anthony A. Laurentano, Esq.

(57) ABSTRACT

End rings are coupled with upper and lower ends of a cylindrical body tube. A plurality of first heat exchanger tubes are fitted and held in holes provided in a pair of first tube plates. A plurality of second heat exchanger tubes are fitted and held in holes provided in a pair of second tube plates. The inside of each first heat exchanger tubes forms a first-fluid passage for carrying a reformed gas. The space defined between an outer wall of each first heat exchanger tube and an inner wall of the corresponding second heat exchanger tube forms a second-fluid passage for carrying a coolant. The space defined among an inner wall of the body tube and outer walls of the second heat exchanger tubes form a third-fluid passage for carrying compressed air.

11 Claims, 10 Drawing Sheets

HEAT EXCHANGER

BACKGROUND OF THE INVENTION

Apparatuses consistent with the present invention relate to heat exchangers capable of heat exchange among three or more fluids.

The heat exchanger is a device for transferring heat energy from a high-temperature fluid to a low-temperature fluid, and is typically employed as a heating, cooling, or heat recovery device of various kinds in a chemical treatment system. For example, hydrogen for use in a fuel cell may generally be produced by subjecting hydrocarbon fuels (feedstocks) such as natural gases to reforming and other treatments, and a fuel reforming system for such a reforming treatment requires several types of heat exchangers. The heat exchangers for use with the fuel reforming system may include, for example: an air cooler for cooling high-temperature and high-pressure air used for reforming treatment and discharged from a compressor to render it reusable as air for driving auxiliary equipment; a gas cooler for cooling a high-temperature reformed gas generated in a reformer; and a superheater for superheating a steam fuel mixture made from steam mixed with air and natural gases.

Typically, the heat exchanger is provided for causing heat exchange to take place between two fluids (e.g., gas and gas, liquid and liquid, gas and liquid, etc.). For systems or devices that require a plurality of heat exchangers, however, is employed an integrated heat exchanger in which a plurality of fin-and-tube type heat exchangers are combined together in order to achieve reductions in footprint and manufacturing cost. By way of example, a heat exchanger making up an air conditioner/water heater of an engine-driven heat pump type is known in the art (see JP 7-4778 A, Paragraph 0013, FIG. 2), which includes three heat exchangers combining to form a single unit: a heat exchanger for a coolant, a radiator, and an outdoor heat exchanger for a refrigerant. The heat exchanger for a coolant transfers heat between the refrigerant and the coolant for cooling an engine that causes a compressor of a refrigerant circuit to do mechanical work. The radiator transfers heat between the air and the coolant for cooling the engine. The heat exchanger for a refrigerant transfers heat between the air and the refrigerant. Another example of the integrated heat exchangers known in the art is a heat exchanger making up an industrial machine, which includes an after cooler for cooling compressed air and an oil cooler for cooling engine oils or the like, combining to form a single unit (see JP 10-213382 A, Paragraph 0018, FIG. 1).

Since the above-described integrated heat exchangers are each designed to form a single unit by simply combining two or more heat exchangers together, heat exchange among three or more fluids could not be achieved in the single-unit heat exchangers without increasing the heat exchange volume.

In the heat exchangers for use with the fuel reforming system as described above, the heat exchanger for cooling the reformed gas generated in the cylindrical reformer with a coolant is preferably designed in a cylindrical shape such that the reformed gas is flowed in its axial direction because such a cylindrical shape serves to maintain the continuity of the passage of the reformed gas and conforms to the requirements imposed on the system layout. In this configuration, a plurality of pipes through which the reformed gas is flowed are disposed within a cylindrical container in which the coolant is flowed, which would increase the amount of the coolant existing in the heat exchanger and would thus require an extended period of time for warming up of the fuel reforming system, disadvantageously decreasing the operation efficiency of the fuel reforming system. Moreover, in this type of the heat exchanger, the cylindrical container would inevitably be large in volume, which would make it difficult to improve the heat exchange performance by increasing the flow rate of the coolant flowed in the cylindrical container. It could be conceivable that the flow rate of the coolant would be increased by providing baffle plates spaced at small spacings in the cylindrical container, but this would increase the pressure loss of the coolant in the cylindrical container, thus causing disadvantageous increase in the load and power consumption of the circulating pump.

Still another example of the integrated heat exchangers known in the art, which appears not to entail the above disadvantages, is a laminated board type heat exchanger making up a helium liquefier/refrigerator or the like, which includes a plurality of porous thermally conductive boards and a plurality of thermally insulating boards with hydraulic passages provided therein. The thermally conductive boards and the thermally insulating boards are laminated alternately, and two channels of hydraulic passages piercing through the laminated layers are formed so that heat exchange takes place between two fluids through the thermally conductive boards while heat transfer across the laminated layers (i.e., between adjacent thermally conductive boards) is blocked by the thermally insulating boards. In addition to the two-channel hydraulic passages for heat exchange, another hydraulic passage through which a pre-cooling refrigerant is passed for heat exchange is formed approximately along the central axis piercing through the laminated layers (see JP 6-55070 U, Paragraphs 0011, 0012, FIG. 1).

This type of the integrated heat exchanger however has the following disadvantages in production process and in reliability of the product. In the production process, a laminated body (composed of elements of several kinds to achieve a desired heat exchange capability) is manufactured by laminating the porous thermally conductive board and the thermally insulating boards alternately with adhesive sheets interleaved between adjacent boards. Therefore, each of the elements should be formed to have holes that constitute the hydraulic passages when the elements are assembled, and should be assembled in such a manner that the angular phases of the elements are accurately aligned with each other; thus, special working tools and assembly devices are required. Moreover, the multilayer structure of this heat exchanger is produced by bonding the alternately stacked porous thermally conductive boards and thermally insulating boards with the adhesive sheets, and thus could hardly avoid incomplete bonding which would entail leakage and/or mixture of the fluids, or other undesirable consequences. To be more specific, there is a potential of peeling or the like as a result of degradation of the adhesive which would progress as the laminated body carries high-temperature fluids over a long period of time.

The present invention has been made with consideration given to the above-discussed disadvantages. The inventors has recognized that it would be desirable to provide a heat exchanger having a relatively simple structure and capable of highly efficient heat exchange among three or more fluids.

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

SUMMARY OF THE INVENTION

In one aspect of the present invention, a heat exchanger for heat exchange among at least three fluids is provided, which includes a plurality of first heat exchanger tubes and a plurality of second heat exchanger tubes each formed to cover one of the first heat exchanger tubes corresponding thereto. Each of the first heat exchanger tubes has a first-fluid passage formed therein to carry a first fluid. Each of the second heat exchanger tubes defines a second-fluid passage formed to carry a second fluid between an inner wall of the above each of the second heat exchanger tubes and an outer wall of the one of the first heat exchanger tubes, and at least one third-fluid passage formed to carry a third fluid around outer walls of the second heat exchanger tubes. A pair of first tube plates is provided on first and second ends of the first heat exchanger tubes, and a pair of second tube plates is provided on first and second ends of the second heat exchanger tubes. A first end ring is provided which extends between an outer edge of one of the first tube plates provided on the first ends of the first heat exchanger tubes and an outer edge of one of the second tube plates provided on the first ends of the second heat exchanger tubes, to define a second-fluid distribution chamber for distributing the second fluid into each second-fluid passage defined by the above each of the second heat exchanger tubes. A second end ring is provided which extends between an outer edge of the other of the first tube plates provided on the second ends of the first heat exchanger tubes and an outer edge of the other of the second tube plates provided on the second ends of the second heat exchanger tubes, to define a second-fluid collection chamber for collecting the second fluid from each second-fluid passage defined by the above each of the second heat exchanger tubes.

According to the above arrangement, heat exchange among three or more fluids is caused to take place in a single and relatively small heat exchanger; therefore, reductions in foot print and manufacturing cost of the system or device using the multiple-fluid heat exchanger can be achieved with ease.

Each of the second heat exchanger tubes may preferably, but not necessarily, be substantially coaxial with (of a cross section substantially concentric with that of) the one of the first heat exchanger tubes covered thereby, and may enclose a midsection (i.e., a portion other than both ends) of the above each of the first heat exchanger tubes. A second-fluid introduction unit may be attached to the first end ring, to feed the second fluid into the second-fluid distribution chamber. A second-fluid discharge unit may be attached to the second end ring, to discharge the second fluid from the second-fluid collection chamber. At least one heat exchanger fin may be attached to the outer walls of the second heat exchanger tubes and exposed to the third-fluid passage. The use of the at least one heat exchanger fin would contribute to improved efficiency in cooling the second fluid by the third fluid (e.g. cooling air). A body tube may be provided which extends between the outer edges of the second tube plates, to define the third-fluid passage. Provision of such a body tube would advantageously make various kinds of gases or liquids (such as prohibited from leaking into the atmosphere) usable as the third fluid. Where the third-fluid passage is defined by the body tube, a third-fluid introduction unit may be attached to the body tube, to feed the third fluid into the third-fluid passage, and a third-fluid discharge unit may be attached to the body tube, to discharge the third fluid from the third-fluid passage. At least one baffle plate may be provided in the third-fluid passage. Provision of the at least one baffle plate would advantageously serve to cause the third fluid to collide with the second heat exchanger tubes.

In the above heat exchanger, the three fluids may preferably, but not necessarily, be such that a heat capacity of the second fluid is greater than those of the first and third fluids. Moreover, it may be preferable that a temperature of the first fluid is higher than a temperature of the second fluid, and a temperature of the third fluid is higher than the temperature of the second fluid. Instead, it may also be preferable that a temperature of the first fluid is higher than a temperature of the second fluid, and the temperature of the second fluid is higher than a temperature of the third fluid. Particular combinations of the fluids selected in accordance with the above-specified criteria would increase the efficiency in heat exchange, thereby allowing the second fluid to cool or heat the first and third fluids more effectively.

In cases where the above heat exchanger is provided in combination with a fuel reforming system in which hydrogen is obtained from hydrocarbon feedstocks in a steam reforming process, the combination of the fluids applied therein may be such that the first fluid a reformed gas generated in a reformer, the second fluid is a coolant, and the third fluid is compressed air generated in a compressor. This heat exchanger would allow the coolant to cool the reformed gas and the compressed air more effectively. Alternatively, the combination may be such that the first fluid is a reformed gas generated in a reformer, the second fluid is a steam fuel mixture, and the third fluid is an exhaust gas. This heat exchanger would make the cooling of the reformed gas and the heating of the steam fuel mixture more efficiently.

The third-fluid passage may be configured in a manner that is adopted for the above second-fluid passage. That is, a plurality of third heat exchanger tubes each formed to cover one of the second heat exchanger tubes corresponding thereto may be provided in such a manner that each of the third heat exchanger tubes define a third-fluid passage formed to carry a third fluid between an inner wall of the above each of the third heat exchanger tubes and an outer wall of the one of the second heat exchanger tubes. In this configuration, a pair of third tube plates are provided on first and second ends of the second heat exchanger tubes, in addition to the first and second tube plates as described above. A third end ring is provided which extends between an outer edge of one of the second tube plates provided on the first ends of the second heat exchanger tubes and an outer edge of one of the third tube plates provided on the first ends of the third heat exchanger tubes, to define a third-fluid distribution chamber for distributing the third fluid into each third-fluid passage defined by the above each of the third heat exchanger tubes. A fourth end ring is provided which extends between an outer edge of the other of the second tube plates provided on the second ends of the second heat exchanger tubes and an outer edge of the other of the third tube plates provided on the second ends of the third heat exchanger tubes, to define a third-fluid collection chamber for collecting the third fluid from each third-fluid passage defined by the above each of the third heat exchanger tubes.

BRIEF DESCRIPTION OF THE DRAWINGS

The above aspects, other advantages and further features of the present invention will become readily apparent from the following description of illustrative, non-limiting embodiments with reference to accompanying drawings, in which.

DETAILED DESCRIPTION OF THE EXEMPLARY EMBODIMENTS

Exemplary embodiments of the present invention as applied to a heat exchanger provided in a fuel reforming system will hereinafter be described in detail with reference to the drawings.

[First Embodiment]

A detailed description will be given of a heat exchanger according to a first embodiment of the present invention with reference to FIGS. 1 through 10, in which the heat exchanger is provided in two types of fuel reforming systems.

<General Design of First Fuel Reforming System>

Figure 1:
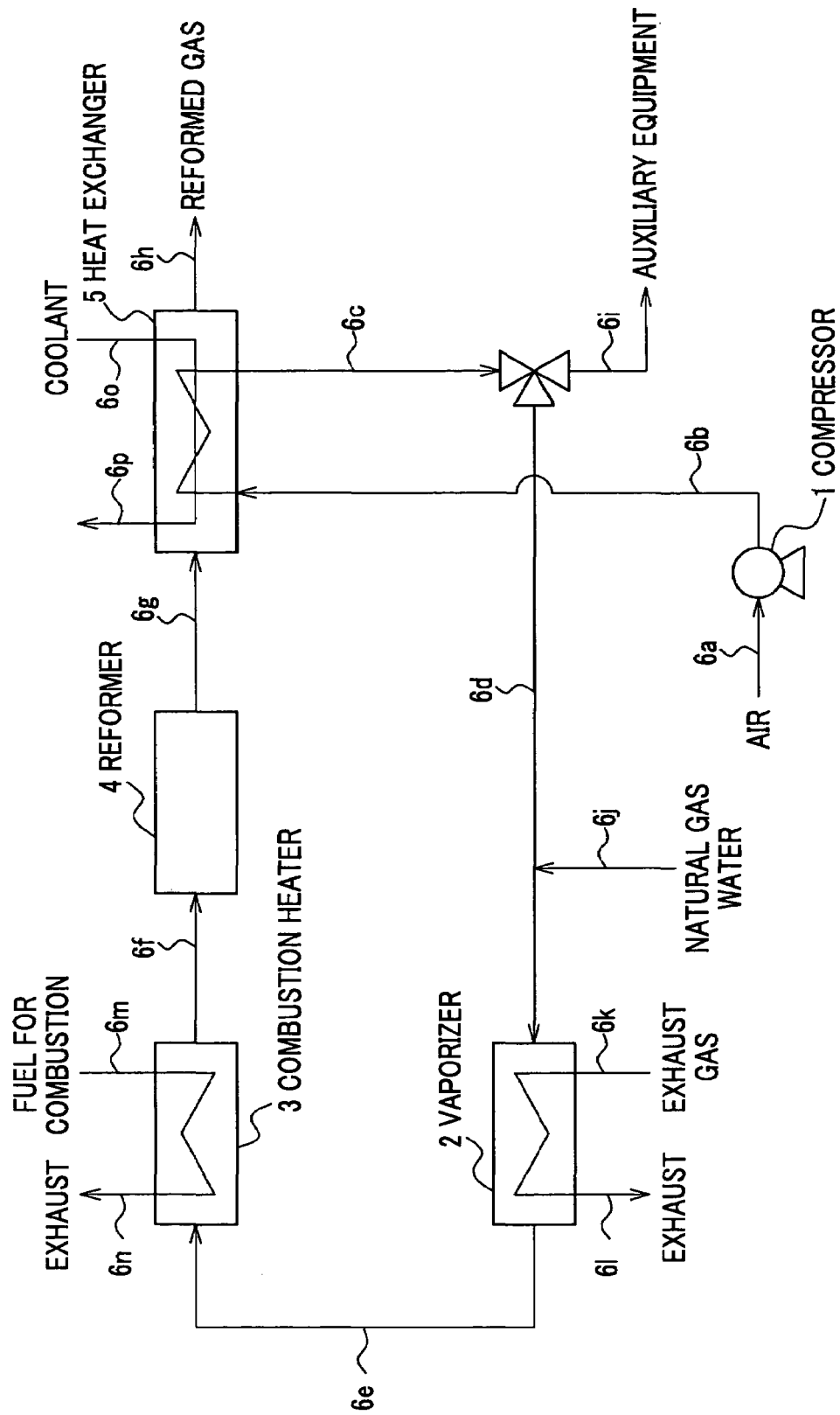
FIG. 1 is a block diagram showing a first fuel reforming system equipped with a heat exchanger according to an exemplary embodiment (first embodiment) of the present invention.

Hereinafter described is a first fuel reforming system that is configured to cool compressed air and a reformed gas using a coolant. The first fuel reforming system as shown in FIG. 1 includes a compressor 1, a vaporizer 2, a combustion heater 3, a reformer 4, a heat exchanger 5, and piping (pipes 6a–6p) installed to couple these units together. The compressor 1 generates compressed air to be supplied to the reformer 4 and other auxiliary equipment of various kinds. The vaporizer 2 heats a natural gas and water supplied from a feedstock supply system (not shown), together with the compressed air supplied from the compressor 1, to generate a steam fuel mixture. The combustion heater 3 burns a combustible fuel (e.g., a natural gas) and utilizes thus-generated heat of combustion to heat the steam fuel mixture supplied from the vaporizer 2. The reformer 4 causes the steam fuel mixture supplied from the combustion heater 3 to react together in the presence of great heat and a catalyst, to generate a reformed gas (hydrogen-rich gas) to be supplied to a shift reaction process. The heat exchanger 5 causes heat exchange to occur between a coolant and the reformed gas and between a coolant and the compressed air, so as to cool the reformed gas and the compressed air.

<Structure of Heat Exchanger According to the First Embodiment>

A description will be given of an exemplary structure of a heat exchanger according to the first embodiment with reference to FIGS. 1 through 10. In describing this and other embodiments that follow, a direction in each figure corresponding to the direction toward the top of FIG. 3 will be referred to as "upward", "upper" or "top", a direction corresponding to the direction toward the bottom of FIG. 3 as "downward", "lower" or "bottom", a direction corresponding to the direction toward the left as "left" or "leftward", and a direction corresponding to the direction toward the right as "right" or "rightward", for convenience of explanation. Components of the fuel reforming systems will be designated by the same reference characters as used in FIG. 1, and a duplicate description thereof will not be given.

Figure 2:
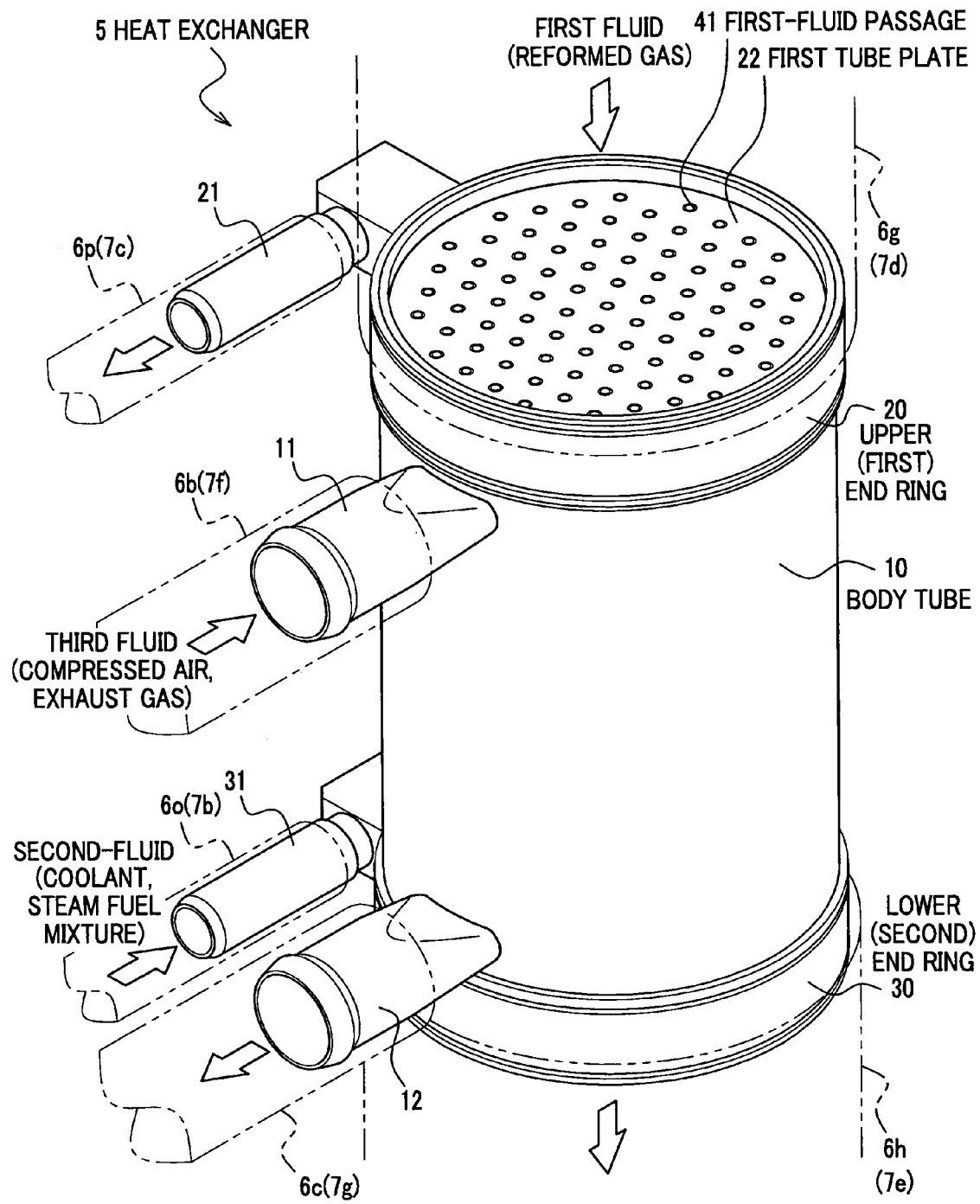
FIG. 2 is a perspective view of the heat exchanger according to the first embodiment.

As shown in FIG. 2, the heat exchanger 5 according to the first embodiment is shaped generally like a cylinder having a body tube 10 shaped like a cylinder and provided with upper and lower end rings 20, 30 which are coupled to top and bottom ends of the body tube 10, respectively. At an upper portion of a periphery of the body tube 10 is provided a third-fluid introduction pipe (third-fluid introduction unit) 11 to which a pipe 6b for introducing compressed air (third fluid) is coupled. At a lower portion of the periphery of the body tube 10 is provided a third-fluid discharge pipe (third-fluid discharge unit) 12 to which a pipe 6c for discharging the compressed air is coupled. At a periphery of the lower end ring 30 is provided a second-fluid introduction pipe (second-fluid introduction unit) 31 to which a pipe 6o for introducing a coolant (second fluid) is coupled. At a periphery of the upper end ring 20 is provided a second-fluid discharge pipe (second-fluid discharge unit) 21 to which a pipe 6p for discharging the coolant is coupled. At a top end of the upper end ring 20 is coupled a pipe 6g for introducing a reformed gas (first fluid), while at a bottom end of the lower end ring 20 is coupled a pipe 6h for discharging the reformed gas.

Figure 3:
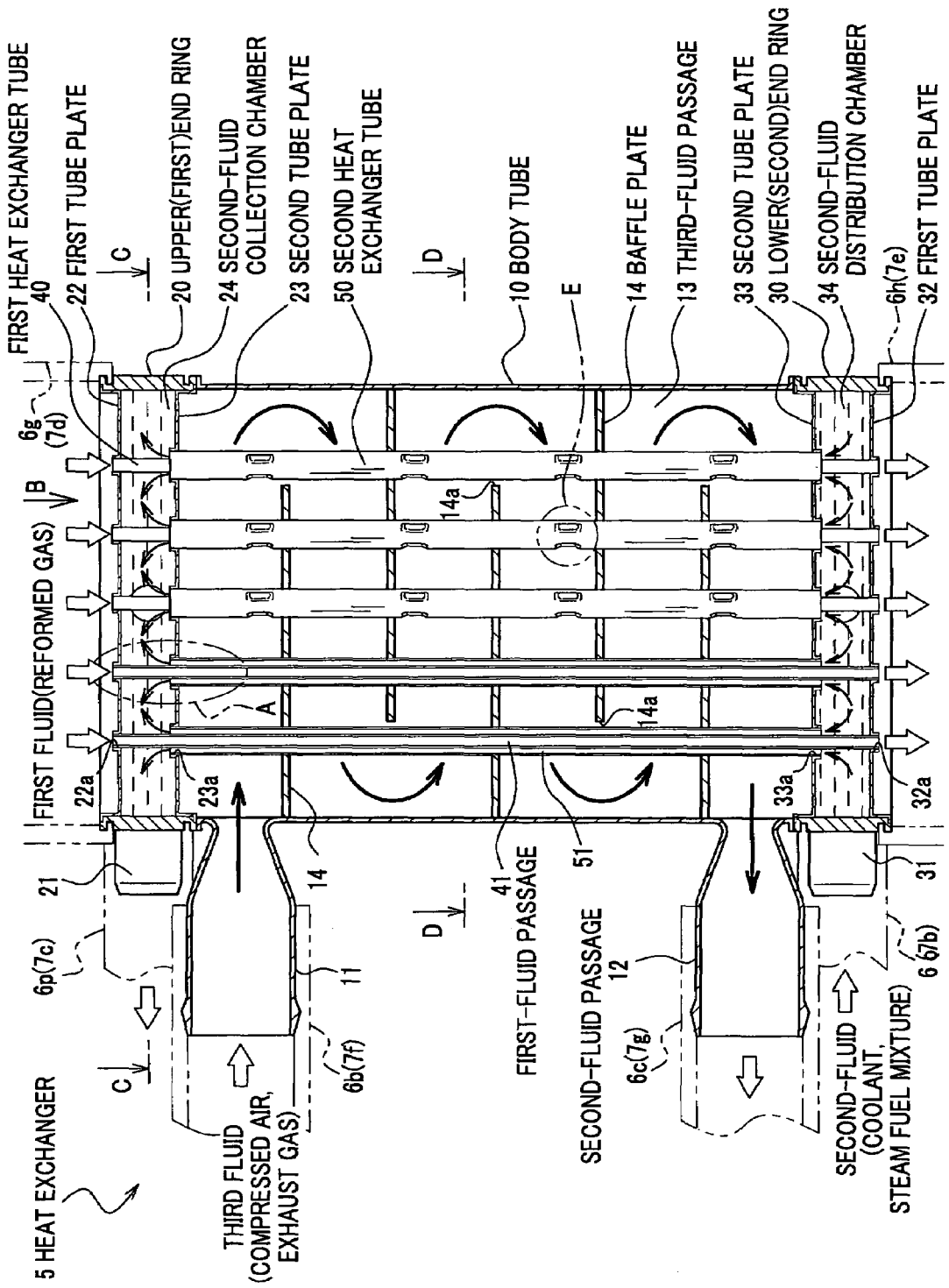
FIG. 3 is a longitudinal section of the heat exchanger according to the first embodiment.

As shown in FIG. 3, inside the upper end ring 20 are provided a first tube plate 22 and a second tube plate 23. The first tube plate 22 is fixed on an inside of a top end portion of the upper end ring 20. The second tube plate 23 is fixed on an inside of a bottom end portion of the upper end ring 20. The upper end ring 20, the first tube plate 22 and the second tube plate 23 combine to define and form a second-fluid collection chamber 24. Similarly, inside the lower end ring 30 are provided another first tube plate 32 and another second tube plate 33. The first tube plate 32 is fixed on an inside of a bottom end portion of the lower end ring 30. The second tube plate 33 is fixed on an inside of an upper end portion of the lower end ring 30. The lower end ring 30, the first tube plate 32 and the second tube plate 33 combine to define and form a second-fluid distribution chamber 34.

Figure 4:
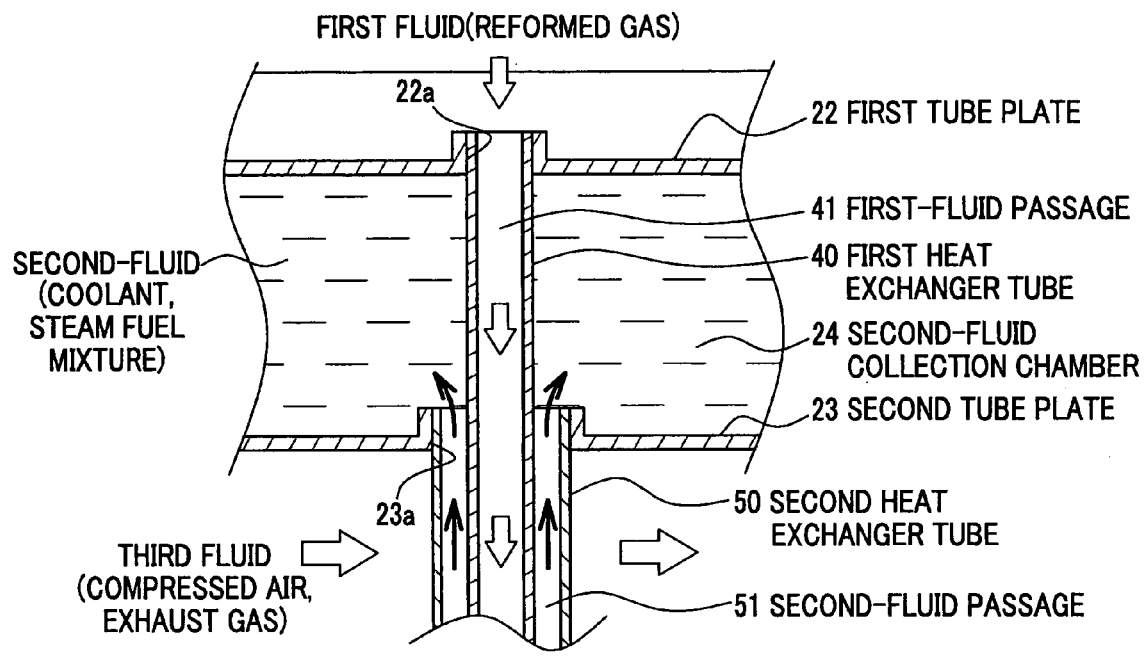
FIG. 4 is an enlarged view of portion A of FIG. 3.
Figure 5:
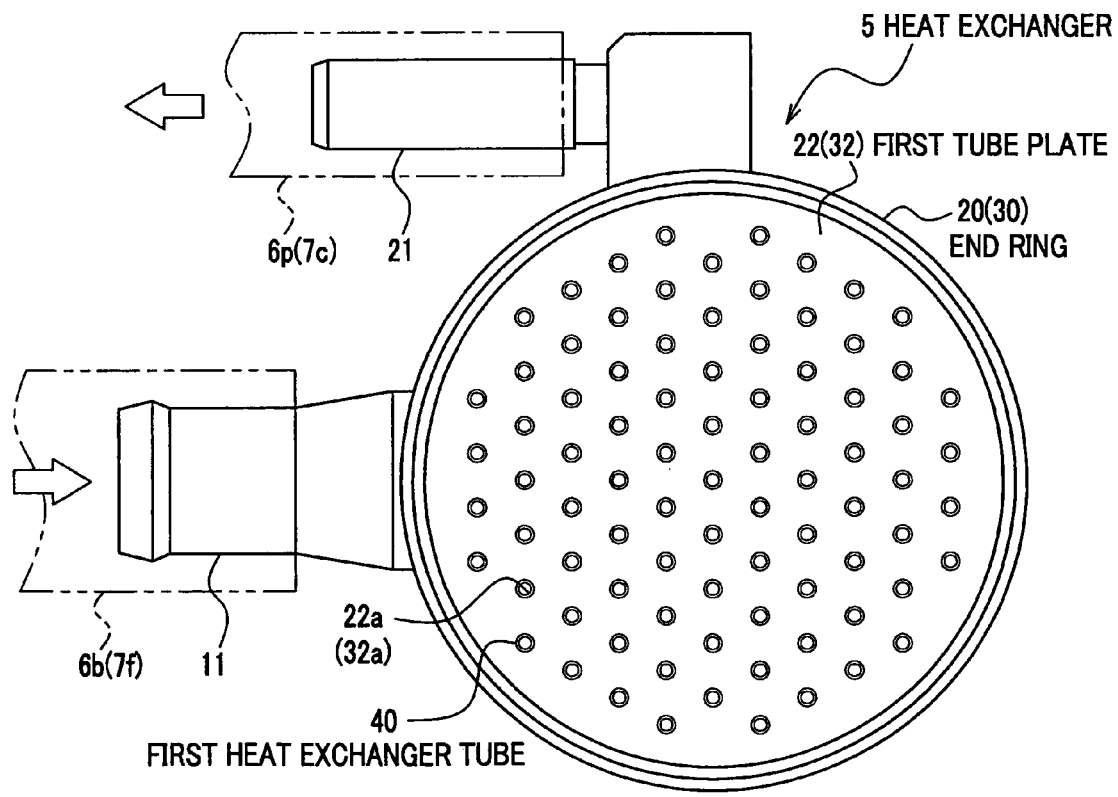
FIG. 5 is a partial plan view as viewed from arrow B of FIG. 3.
Figure 6:
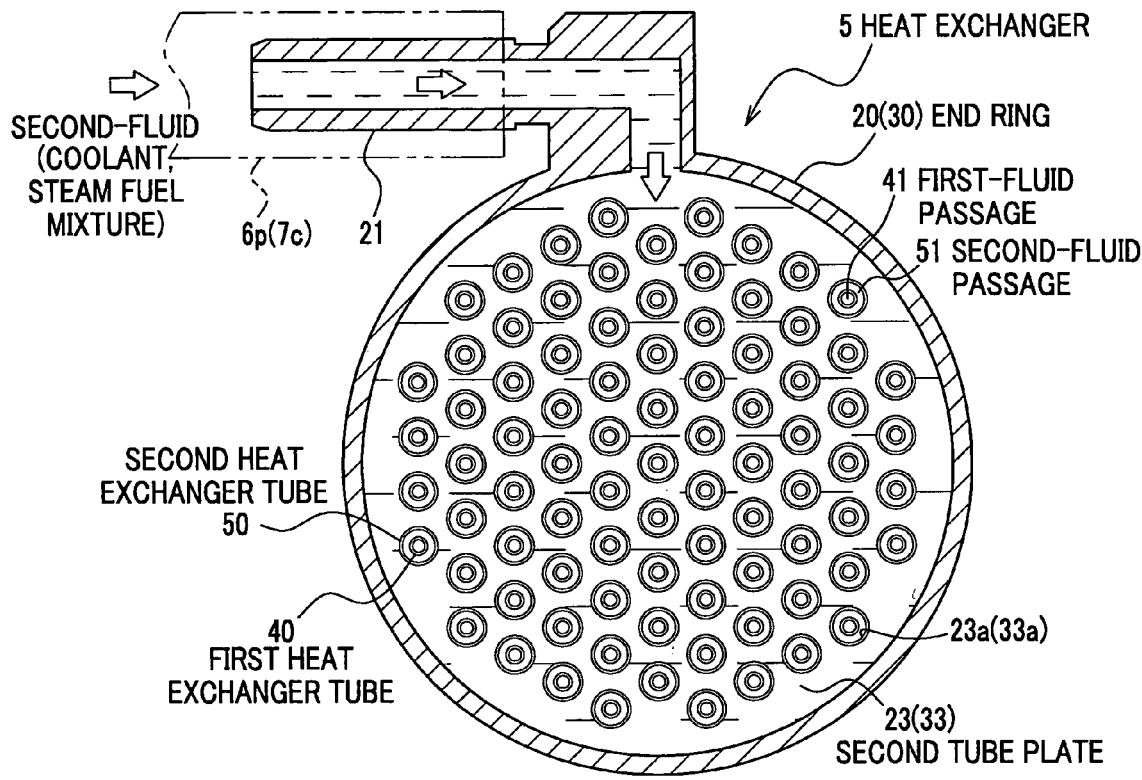
FIG. 6 is a cross section taken along line C—C of FIG. 3.

As shown in FIGS. 3, 4 and 5, a plurality of holding holes 22a (32a) are provided in the first tube plates 22 (32), and a plurality of first heat exchanger tubes 40 are fitted and held in the respective holding holes 22a (32a). As shown in FIGS. 3, 4 and 6, a plurality of holding holes 23a (33a) concentric with the holding holes 22a (32a) are provided in the second tube plates 23 (33), and a plurality of second heat exchanger tubes 50 covering the respective first heat exchanger tubes 40 are fitted and held in the respective holding holes 23a (33a).

Figure 8:
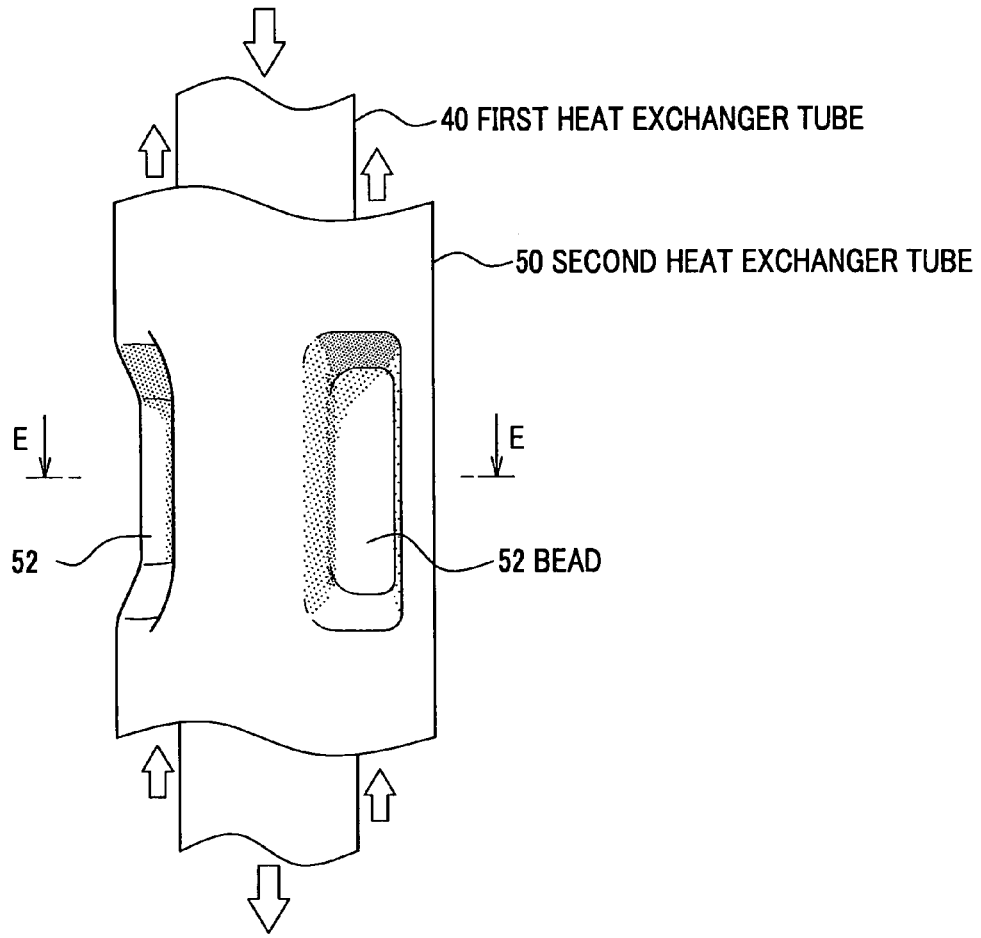
FIG. 8 is an enlarged view of portion E of FIG. 3.
Figure 9:
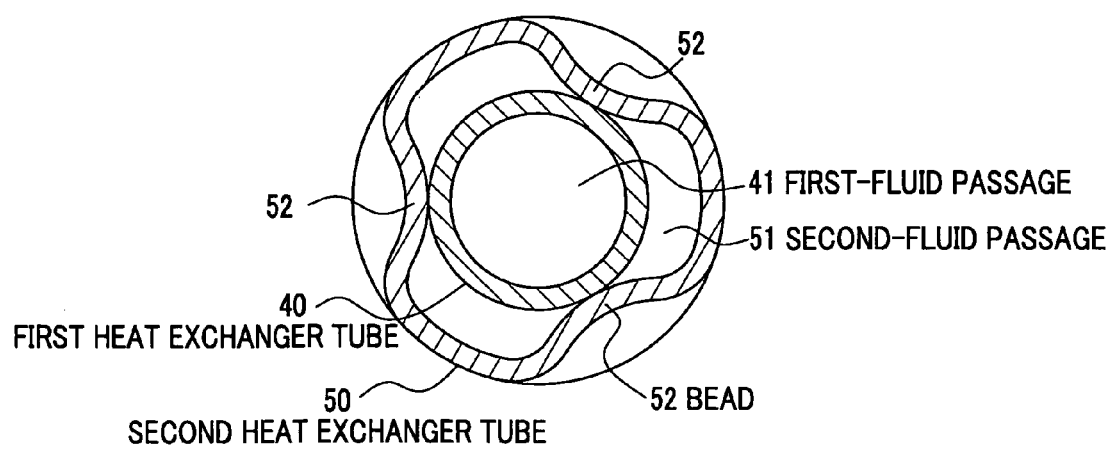
FIG. 9 is a cross section taken along line F—F of FIG. 7.

The inside of each first heat exchanger tube 40 forms a first-fluid passage 41 for carrying a reformed gas (first fluid). The space defined between an outer wall of each first heat exchanger tube 40 and an inner wall of each second heat exchanger tube 50 forms a second-fluid passage 51 for carrying a coolant (second fluid). The space defined among an inner wall of the body tube 10 and outer walls of the second heat exchanger tubes 50 forms a third-fluid passage 13 for carrying compressed air (third fluid). As shown in FIGS. 8 and 9, three beads 52 inwardly protruding toward a common central axis are provided on the periphery of each second heat exchanger tube 50. As shown in FIG. 3, several sets of such three beads 52 are provided at several locations spaced a predetermined distance along the length of each of the second heat exchanger tubes 50. Since the vertex of each bead is in contact with the first heat exchanger tube 40, the concentricity (coaxiality) of each second heat exchanger tubes 50 with the corresponding first heat exchanger tube 40 is maintained.

Figure 7:
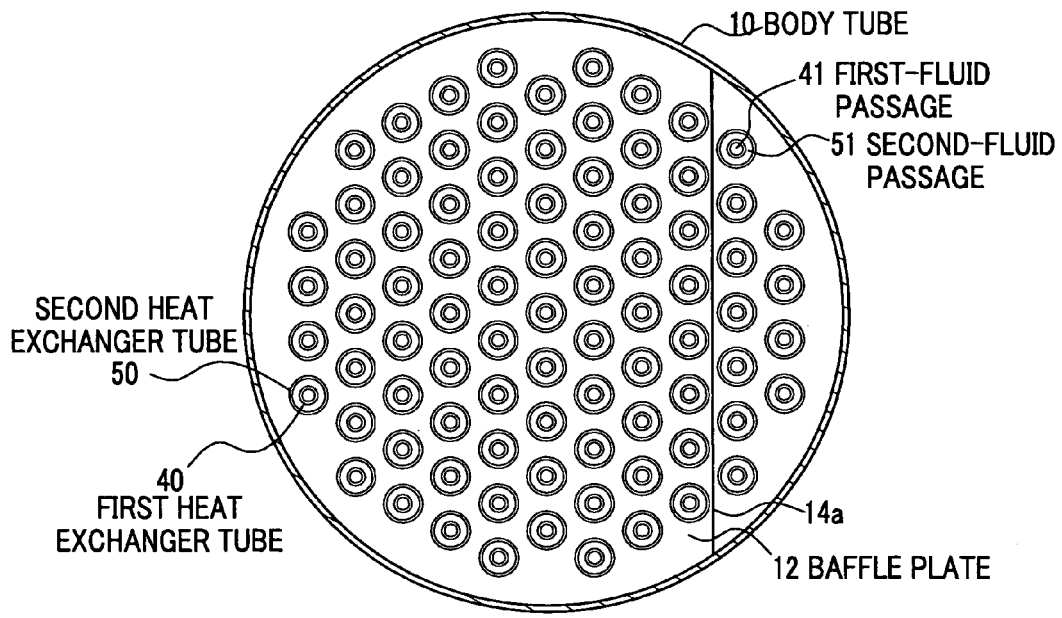
FIG. 7 is a cross section taken along line D—D of FIG. 3.

As shown in FIG. 3, on the inner wall of the body tube 10 are provided five baffle plates 14 which extend horizontally at locations vertically spaced a predetermined distance from adjacent baffle plates 14. As shown in FIG. 7, each baffle plate 14 is shaped like a circular disc with a segment cut out which disc has a diameter substantially equal to an inside diameter of the body tube 10. The baffle plates are disposed within the body tube 10 in such a manner that straight edges 14a of the baffle plates 14 each left where the segment is cut out are oriented alternately toward opposite directions (right and left), whereby the third-fluid passage 13 is formed into a meandering passage that allows the third fluid to wind its way therethrough alternately to the right and to the left.

<Operation of First Fuel Reforming System>

A description will be given of an exemplary operation of the first fuel reforming system with reference made to FIGS. 1 through 9 where appropriate.

When the first fuel reforming system starts its reforming operation, the compressor 1 compresses air taken through a pipe 6a from outside, and compressed air having a relatively high temperature (e.g., 120° C.) thus generated in the compressor 1 is flowed through the pipe 6b and the third-fluid introduction pipe 11 provided at an upper portion of the heat exchanger 5 into the third-fluid passage 13. Simultaneously, a coolant (antifreeze) fed from a cooling system (not shown) is flowed through the pipe 6o and the second-fluid introduction pipe 31 into the second-fluid distribution chamber 34 provided in a lower portion of the heat exchanger 5.

While the compressed air flowed into the third-fluid passage 13 is guided by the baffle plates 14 to meander downwardly inside the body tube 10, the compressed air collides with the second heat exchanger tubes 50 from rightward and leftward directions. The coolant flowed into the second-fluid distribution chamber 34 is distributed into a plurality of the second-fluid passages 51 each defined in the annular space between the first heat exchanger tube 40 and the second heat exchanger tube 50 to flow upwardly in the heat exchanger 5 while keeping in contact with the inner wall of each second heat exchanger tube 50. Accordingly, heat exchange between the compressed air and the coolant is caused to occur through a thin wall of each second heat exchanger tube 50, and the temperature of the compressed air is thereby lowered swiftly to a predetermined level (e.g., 70° C.). Consequently, when the compressed air is supplied through an air pipe 6i to an air-driven accessory or other equipment, a detrimental effect that would otherwise be derived from heat is unlikely to show up in the accessory, flow control valves or the like.

The compressed air cooled in the heat exchanger 5 and flowed out through the third-fluid discharge pipe 12 passes through the pipe 6c to an air pipe 6d and then merges with a natural gas and water supplied through a feedstock supply pipe 6j, and is eventually flowed into the vaporizer 2. In the vaporizer 2, an exhaust gas supplied through an exhaust gas supply pipe 6k burns in the presence of a catalyst, and a thermal energy derived from combustion of the exhaust gas heats the natural gas and water, thereby generating a relatively high-temperature steam fuel mixture. The exhaust gas is discharged from the vaporizer 2 through a pipe 6l to the outside.

The steam fuel mixture generated in the vaporizer 2 is flowed through a fuel pipe 6e into the combustion heater 3. In the combustion heater 3, a fuel supplied from a combustion fuel supply pipe 6m burns, and a thermal energy derived from combustion of the fuel heats the steam fuel mixture to a higher temperature (e.g., 500° C.). An exhaust gas resulting from the combustion is discharged from the combustion heater 3 through a pipe 6n to the outside.

The steam fuel mixture heated in the combustion heater 3 is flowed through a fuel pipe 6f into the reformer 4. In the reformer 4, the steam fuel mixture heated in the combustion heater 3 comes in contact with a reforming catalyst, and a catalytic reaction resulting therefrom generates a high-temperature reformed gas (hydrogen-rich gas) having a temperature of 650° C., for example.

The reformed gas generated in the reformer 4 is flowed through the pipe 6g into the upper portion of the heat exchanger 5, and then introduced through openings provided in the first tube plate 22 into the first-fluid passages 41, to flow downwardly in the body tube 10 while keeping in contact with the inner wall of each first heat exchanger tube 40. Accordingly, heat exchange between the reformed gas and the coolant is caused to occur through a thin wall of each first heat exchanger tube 40, and the temperature of the reformed gas is thereby lowered swiftly to a predetermined level (e.g., 150° C.). The reformed gas cooled in the heat exchanger 5 is supplied through the pipe 6h into a shift reaction process and the like.

As described above, the heat exchanger 5 in the first fuel reforming system, despite its relatively compact, easy-to-use and easy-to-manufacture structure, can efficiently cool the compressed air and reformed gas which would conventionally be cooled separately in their respective heat exchangers. Moreover, the amount of the coolant in the heat exchanger 5 is smaller than those in the conventional heat exchangers, and thus a warm-up period of the fuel reforming system can be made shorter. Furthermore, the second-fluid passages 51 for carrying the coolant are straight, and thus the pressure loss of the coolant in the heat exchanger 5 can be reduced with the result that the load and power consumption of the circulation pump in the cooling system can be reduced.

Next, a second fuel reforming system equipped with a heat exchanger according to the first embodiment will come up for discussion.

<General Design of Second Fuel Reforming System>

Figure 10:
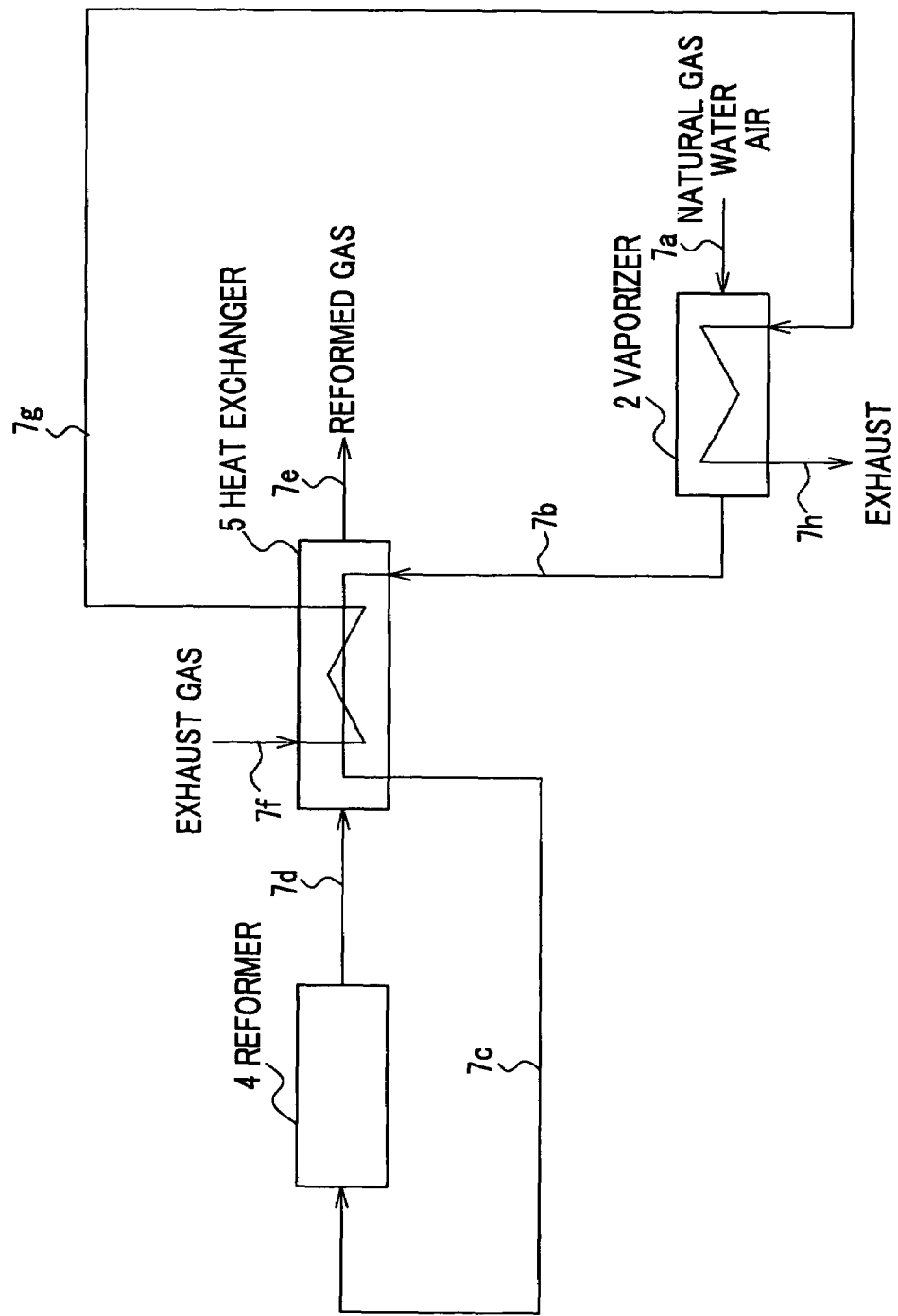
FIG. 10 is a block diagram showing a second fuel reforming system equipped with a heat exchanger according to the first embodiment of the present invention.

A second fuel reforming system is configured to heat a steam fuel mixture using a reformed gas as well as to cool the reformed gas using an exhaust gas and the steam fuel mixture. As shown in FIG. 10, the second fuel reforming system includes a vaporizer 2, a reformer 4, a heat exchanger 5, and piping (pipes 7a-7h) installed to couple these units together. The vaporizer 2 burns an exhaust gas containing combustible materials, such as hydrogen, etc., stored in an exhaust gas tank, and utilizes thus-generated heat of combustion to heat a natural gas, water and air supplied from a feedstock supply system (not shown), thereby generating a steam fuel mixture. The reformer 4 causes the steam fuel mixture to react together in the presence of greater heat and a catalyst, to generate a reformed gas (hydrogen-rich gas) to be supplied to a shift reaction process and the like. The heat exchanger 5 causes heat exchange to occur among the reformed gas, the exhaust gas and the steam fuel mixture, and the structure thereof may be substantially the same as that of the above-described heat exchanger equipped in the first fuel reforming system.

<Operation of Second Fuel Reforming System>

A description will be given of an exemplary operation of the second fuel reforming system with reference made to FIGS. 2 through 10 as appropriate.

When the second fuel reforming system starts its reforming operation, a natural gas, water and air supplied through a feedstock supply pipe 7a is flowed into the vaporizer 2. In the vaporizer 2, an exhaust gas supplied through an exhaust gas supply pipe 7g burns in the presence of a catalyst, and a thermal energy derived from combustion of the exhaust gas heats the compressed air, natural gas and water, thereby generating a relatively high-temperature steam fuel mixture (having a temperature of 150° C., for example). The exhaust gas used in the vaporizer 2 is discharged through a pipe 7h to the outside.

The steam fuel mixture generated in the vaporizer 2 is flowed through a pipe 7b and the second-fluid introduction pipe 31 into a second-fluid distribution chamber 34 provided in a lower portion of the heat exchanger 5. Simultaneously, an exhaust gas having a relatively low temperature (e.g., 20-30° C.) supplied from an exhaust gas tank (not shown) is flowed through a pipe 7f and the third-fluid introduction pipe 11 provided at an upper portion of the heat exchanger 5 into the third-fluid passage 13. Moreover, a reformed gas generated in the reformer 4 (having an elevated temperature of 650° C., for example) is flowed through a pipe 7d into the upper portion of the heat exchanger 5, and then introduced through openings provided in the first tube plate 22 into the first-fluid passages 41.

The relatively high-temperature steam fuel mixture flowed into the second-fluid distribution chamber 34 is distributed into a plurality of the second-fluid passages 51 each defined in the annular space between the first heat exchange tube 40 and the second heat exchanger tube 50 to flow upwardly in the heat exchanger 5 while keeping in contact with the inner wall of each second heat exchanger tube 50. Meanwhile, the relatively low-temperature exhaust gas flowed into the third-fluid passage 13 is guided by the baffle plates 14 to meander downwardly inside the body tube 10, and collides with the second heat exchanger tubes 50 from rightward and leftward directions. Moreover, the high-temperature reformed gas flowed into the first-fluid passages 41 flows downwardly in the heat exchanger 5 while keeping in contact with the inner wall of each first heat exchanger tube 40.

Accordingly, heat exchange between the reformed gas and the steam fuel mixture is caused to occur through a thin wall of each first heat exchanger tube 40, while heat exchange between the steam fuel mixture and the exhaust gas is caused to occur through a thin wall of each heat exchanger tube 50. Consequently, in the heat exchanger 5, the temperature of the reformed gas is lowered swiftly to a predetermined level (e.g., 200° C.), and the temperature of the steam fuel mixture is raised swiftly to a predetermined level (e.g., 500° C.).

The steam fuel mixture is flowed through the fuel pipe 7c into the reformer 4. In the reformer 4, the steam fuel mixture, thus heated, comes in contact with a reforming catalyst, and a catalytic reaction resulting therefrom generates a high-temperature reformed gas (hydrogen-rich gas) having a temperature of 650° C., for example.

The high-temperature reformed gas generated in the reformer 4 is flowed through the pipe 7d into the upper portion of the heat exchanger 5, then cooled therein as described above, and supplied through a pipe 7e into a shift reaction process and the like.

As described above, the heat exchanger 5 in the second fuel reforming system, despite its relatively compact, easy-to-use and easy-to-manufacture structure, can efficiently heat or cool the steam fuel mixture and reformed gas which would conventionally be cooled separately in their respective heat exchangers.

[Second Embodiment]

Figure 11:
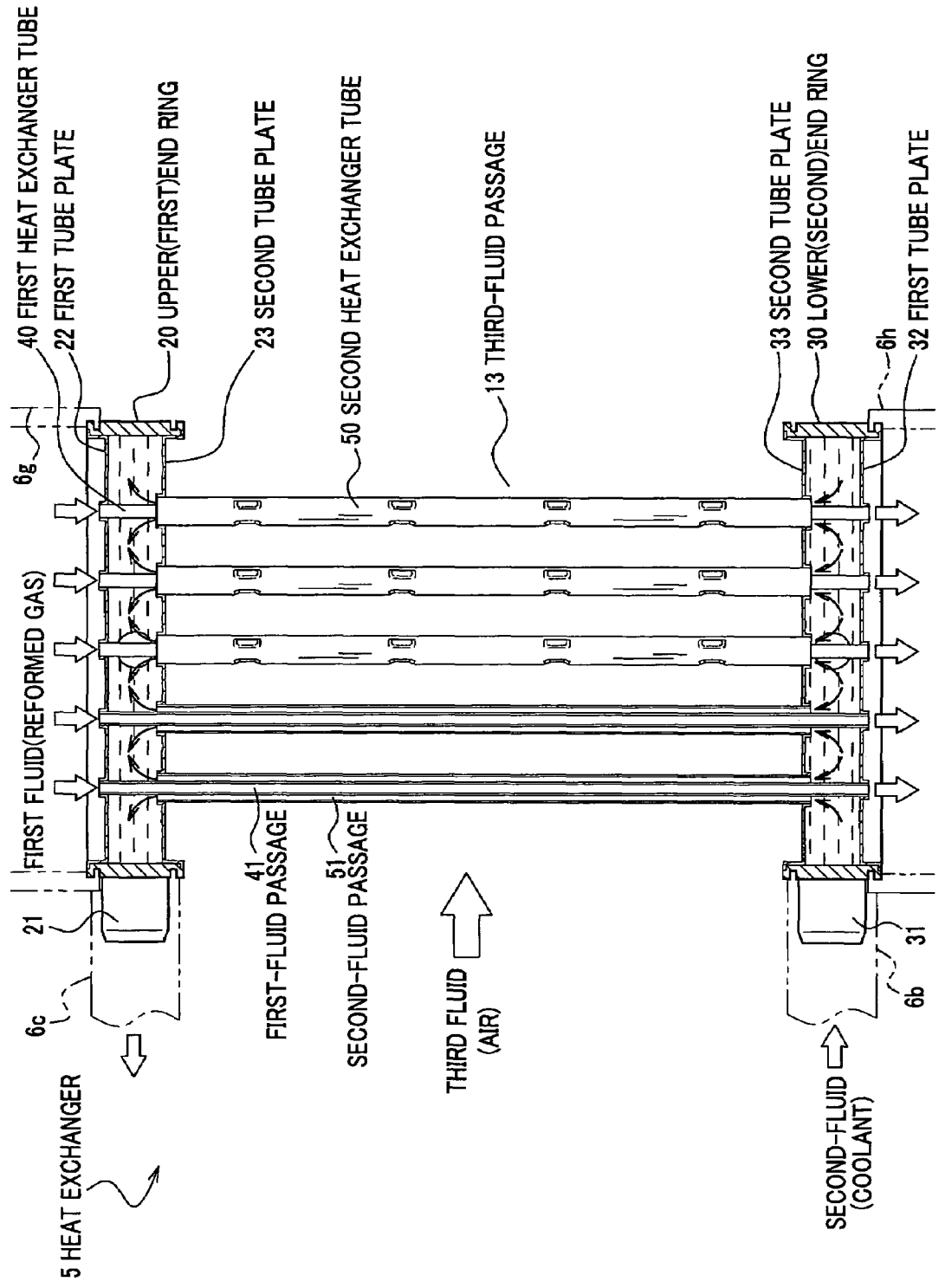
FIG. 11 is a longitudinal section of the heat exchanger according to a second embodiment of the present invention.

A description will be given of a heat exchanger according to a second embodiment of the present invention with reference to FIG. 11. The heat exchanger 5 according to the second embodiment is, as shown in FIG. 11, substantially the same in structure as that according to the first embodiment, except that the body tube 10 serving to make up a shell of the heat exchanger 5 in the first embodiment is not provided; therefore, a duplicate description of the structure of the heat exchanger 5 is omitted herein.

The heat exchanger 5 according to the second embodiment lends itself, for example, to particular applications such that a high-temperature gas (first fluid) passing through first-fluid passages 41 is cooled using a coolant (second fluid) passing through second-fluid passages 51, and the coolant passing through the second-fluid passages 51 is cooled using air (third fluid) flowing around the second heat exchanger tubes 50. To be more specific, the heat exchanger 5 according to the second embodiment may be suitably employed for a compact cooler provided in a fuel reforming system to rapidly cool a reformed gas using a coolant and cooling air, as well as for an auxiliary radiator or the like provided in an automobile to cool an oil for an automatic transmission and cooling water for an engine using wind that sweeps through the auxiliary radiator or the like as the automobile drives.

[Third Embodiment]

Figure 12:
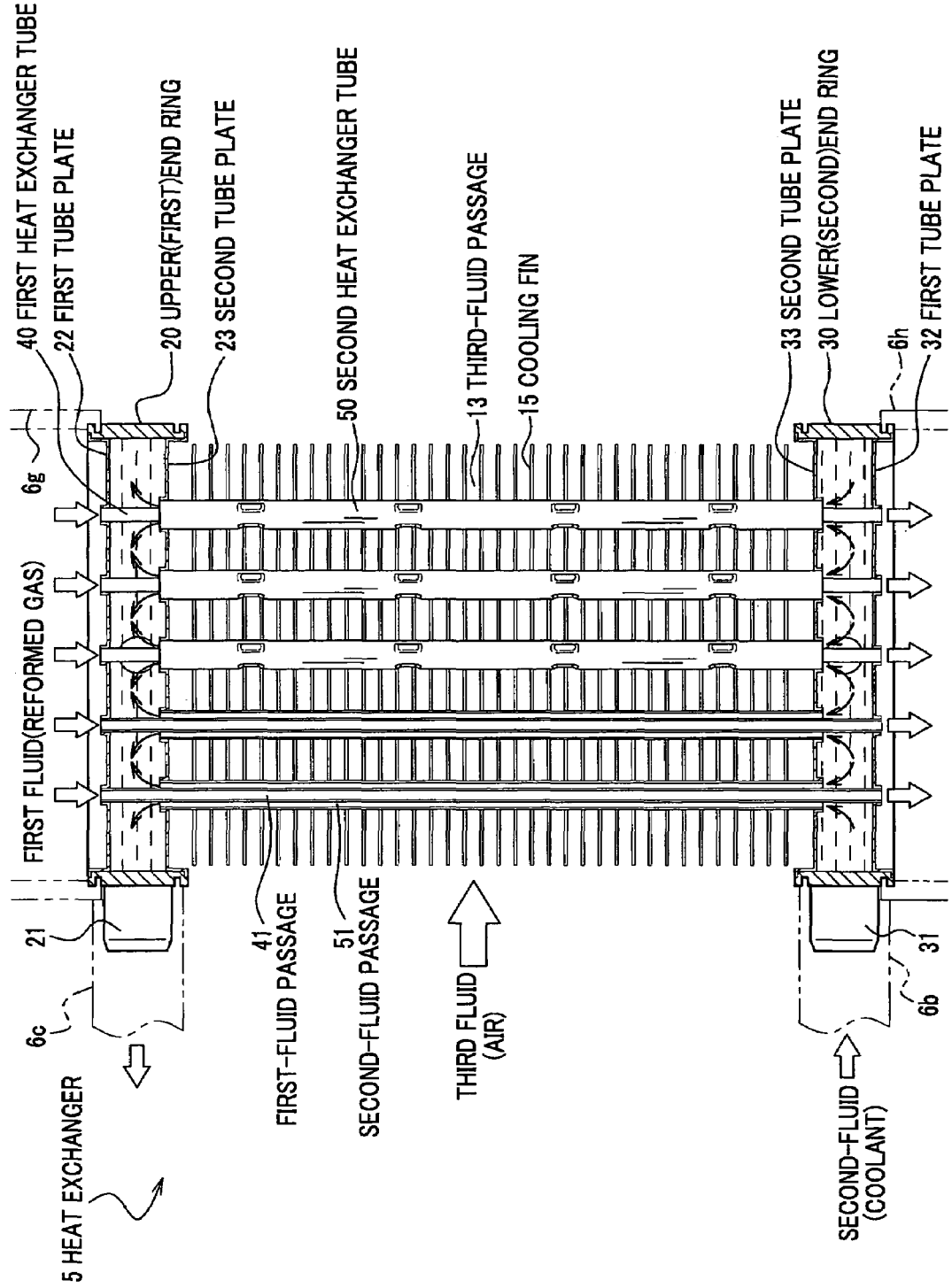
FIG. 12 is a longitudinal section of the heat exchanger according to a third embodiment of the present invention.

A description will be given of a heat exchanger according to a third embodiment of the present invention with reference to FIG. 12. The heat exchanger 5 according to the third embodiment is, as shown in FIG. 12, substantially the same in structure as that according to the second embodiment, except that a plurality of cooling fins 15 are provided in the third-fluid passage 13. The fins 15 may be attached to the outer walls of the second heat exchanger tubes 50 and exposed to the third-fluid passage 13. The heat exchanger 5 according to the third embodiment may be suitable for such particular applications as mentioned above in describing the second embodiment.

[Fourth Embodiment]

A description will be given of a heat exchanger according to a fourth embodiment of the present invention with reference to FIG. 13. In the fourth embodiment, a plurality of third heat exchanger tubes and several other components are added to the heat exchanger 5 according to the first embodiment in order to enable heat exchange to take place among four fluids.

Figure 13:
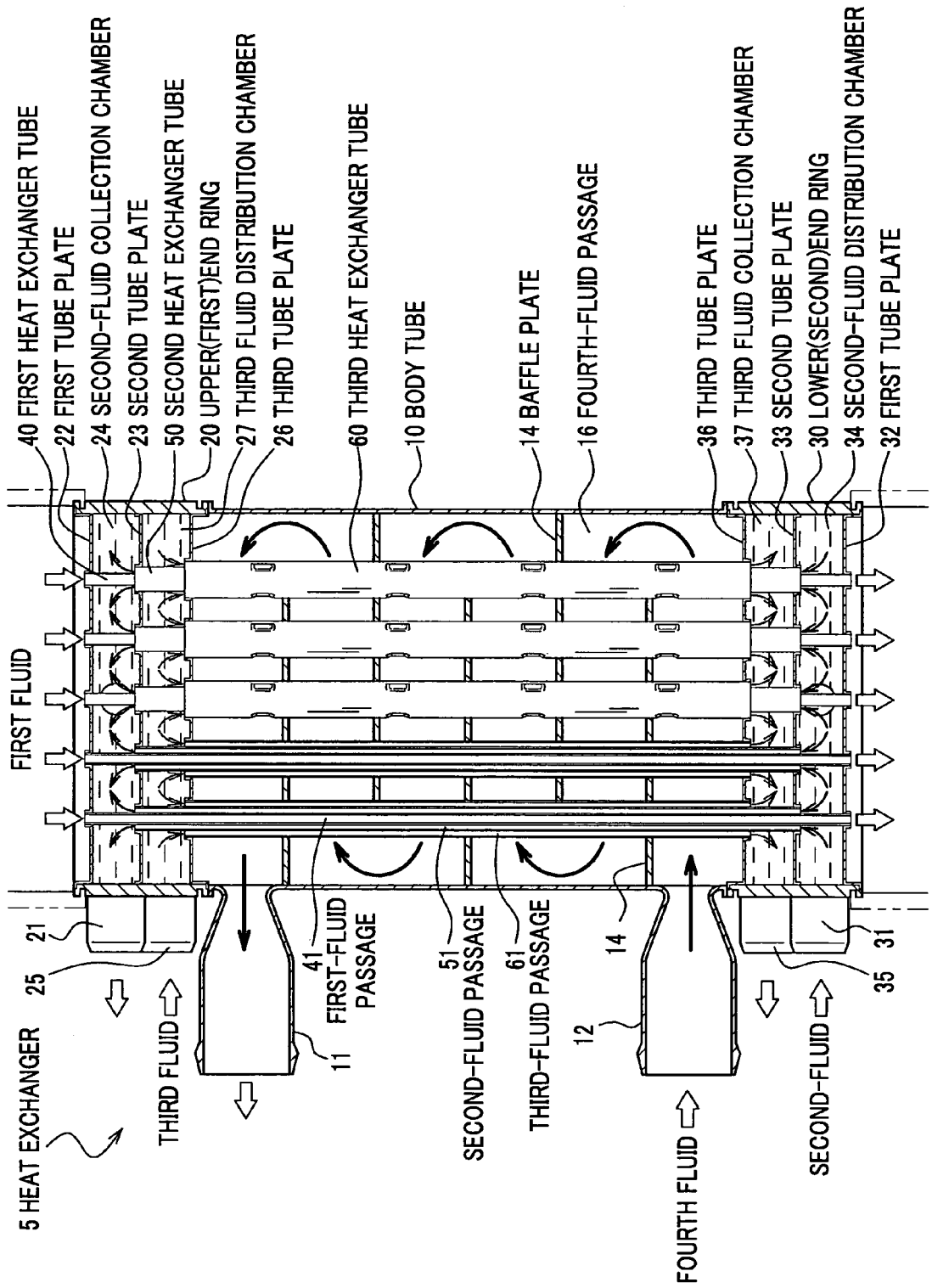
FIG. 13 is a longitudinal section of the heat exchanger according to a fourth embodiment of the present invention.

As shown in FIG. 13, in the heat exchanger 5 according to the fourth embodiment, inside the upper end ring 20 are further provided a third tube plate 26 fixed on the inside of a bottom end portion of the upper end ring 20 at a location below the second tube plate 23 fixed on the inside of a middle portion (instead of the bottom end portion) of the upper end ring 20 so as to define and form a third-fluid distribution chamber 27 between the second and third tube plates 23 and 26. Similarly, inside the lower end ring 30 are further provided another third tube plate 36 fixed on the inside of a bottom end portion of the lower end ring 30 at a location above the second tube plate 33 fixed on the inside of a middle portion (instead of the upper end portion) of the lower end ring 30 so as to define and form a third-fluid collection chamber 37. A plurality of third heat exchanger tubes 60 covering the corresponding second heat exchanger tubes 50 are provided between the third tube plates 26 and 36, with upper and lower ends of each third heat exchanger tube 60 fitted/held in holding holes provided in the third tube plates 26 and 36, respectively. The space defined between an outer wall of each second heat exchanger tube 50 and an inner wall of each third heat exchanger tube 60 forms a third-fluid passage 61 for carrying a third fluid. The space defined among an inner wall of the body tube 10 and outer walls of the third heat exchanger tubes 60 forms a fourth-fluid passage 16 for carrying a fourth fluid. In the fourth embodiment, the upper end ring 20 serves to make up a common shell (external wall) of the second-fluid collection chamber 24 and the third-fluid distribution chamber 27, and the lower end ring 30 serves to make up a common shell (external wall) of the third-fluid the second-fluid distribution chamber 34 and the third-fluid collection chamber 37; it is however to be understood that the second-fluid collection chamber 24, the third-fluid distribution chamber 27, the second-fluid distribution chamber 34 and the third-fluid collection chamber 37 may have respective external walls (i.e., first through fourth end rings, as defined under the heading of "Summary of the Invention").

According to the fourth embodiment having the structure as described above, heat exchange can be caused to take place among four fluids by flowing them through the first- through fourth-fluid passages, respectively.

It is contemplated that the present invention is not limited to the above-illustrated embodiments, or rather, various modifications and changes may be made to the specific exemplary embodiments of the invention without departing from the spirit and scope of the present invention as defined in the following claims.

For example, the above-described embodiments are each described as including end rings and body tube each shaped like a round cylinder, but each of these components may, for example, be shaped like a rectangular tube. A first-fluid distribution chamber and/or a first-fluid collection chamber may be provided above the first tube plate 22 and under the first tube plate 32. In this instance, the first fluid may be introduced and/or discharged through a periphery (side wall) of the heat exchanger 5. Heat exchange may be caused to take place among five or more fluids by further adding heat exchanger tubes and tube plates to the heat exchanger 5 according to the fourth embodiment. Furthermore, the construction of the fuel reforming system to which the heat exchanger according to the present invention is applicable may be selected without limitation, and the shape of each component and the method of joining several components may be modified without departing from the scope of the present invention.

What is claimed is:

1. A heat exchanger for heat exchange among at least three fluids, comprising:

a plurality of first heat exchanger tubes, each having a first-fluid passage formed therein to carry a first fluid;

a plurality of second heat exchanger tubes each formed to cover one of the first heat exchanger tubes corresponding thereto, each one of the second heat exchanger tubes defining a second-fluid passage formed to carry a second fluid between an inner wall of the one of the second heat exchanger tubes and an outer wall of the one of the first heat exchanger tubes;

a plurality of third heat exchanger tubes each formed to cover one of the second heat exchanger tubes corresponding thereto, each one of the third heat exchanger tubes defining a third-fluid passage formed to carry a third fluid between an inner wall of the one of the third heat exchanger tubes and an outer wall of the one of the second heat exchanger tubes;

a pair of first tube plates provided on first and second ends of the first heat exchanger tubes;

a pair of second tube plates provided on first and second ends of the second heat exchanger tubes;

a pair of third tube plates provided on first and second ends of the second heat exchanger tubes;

a first end ring extending between an outer edge of one of the first tube plates provided on the first ends of the first heat exchanger tubes and an outer edge of one of the second tube plates provided on the first ends of the second heat exchanger tubes, to define a second-fluid distribution chamber for distributing the second fluid into each second-fluid passage defined by each of the second heat exchanger tubes;

a second end ring extending between an outer edge of the other of the first tube plates provided on the second ends of the first heat exchanger tubes and an outer edge of the other of the second tube plates provided on the second ends of the second heat exchanger tubes, to define a second-fluid collection chamber for collecting the second fluid from each second-fluid passage defined by each of the second heat exchanger tubes;

a third end ring extending between an outer edge of one of the second tube plates provided on the first ends of the second heat exchanger tubes and an outer edge of one of the third tube plates provided on the first ends of the third heat exchanger tubes, to define a third-fluid distribution chamber for distributing the third fluid into each third-fluid passage defined by each of the third heat exchanger tubes; and a fourth end ring extending between an outer edge of the other of the second tube plates provided on the second ends of the second heat exchanger tubes and an outer edge of the other of the third tube plates provided on the second ends of the third heat exchanger tubes, to define a third-fluid collection chamber for collecting the third fluid from each third-fluid passage defined by each of the third heat exchanger tubes.

2. A heat exchanger according to claim 1, wherein each one of the third heat exchanger tubes, one of the second heat exchanger tubes covered by the one of the third heat exchanger tubes, and one of the first heat exchanger tubes covered by the one of the second heat exchanger tubes are substantially coaxial with each other; and wherein the one of the third heat exchanger tubes encloses a midsection of the one of the second heat exchanger tubes, and the one of the second heat exchanger tubes encloses a midsection of the one of the first heat exchanger tubes.

3. A heat exchanger according to claim 1, further comprising a second-fluid introduction unit attached to the first end ring, to feed the second fluid into the second-fluid distribution chamber.

4. A heat exchanger according to claim 1, further comprising a second-fluid discharge unit attached to the second end ring, to discharge the second fluid from the second-fluid collection chamber.

5. A heat exchanger according to claim 1, further comprising a third-fluid introduction unit attached to the third end ring, to feed the third fluid into the third-fluid distribution chamber.

6. A heat exchanger according to claim 1, further comprising a second-fluid discharge unit attached to the fourth end ring, to discharge the third fluid from the third-fluid collection chamber.

7. A heat exchanger according to claim 1, wherein at least one fourth-fluid passage is formed to carry a fourth fluid around outer walls of the third heat exchanger tubes.

8. A heat exchanger according to claim 1, further comprising a body tube extending between the outer edges of the third tube plates, to define the fourth-fluid passage.

9. A heat exchanger according to claim 8, further comprising a fourth-fluid introduction unit attached to the body tube, to feed the fourth fluid into the fourth-fluid passage.

10. A heat exchanger according to claim 8, further comprising a fourth-fluid discharge unit attached to the body tube, to discharge the fourth-fluid from the fourth-fluid passage.

11. A heat exchanger according to claim 8, further comprising at least one baffle plate provided in the fourth-fluid passage.

* * * * *